US012811350B2

(12) United States Patent
Narimatsu et al.

(10) Patent No.: US 12,811,350 B2
(45) Date of Patent: Nov. 24, 2026

(54) PLATE-SHAPED MEMBER, CONNECTOR FIXING METHOD, LITHOGRAPHY APPARATUS, AND MANUFACTURING METHOD OF ARTICLE

(71) Applicant: CANON KABUSHIKI KAISHA, Tokyo (JP)

(72) Inventors: Mizuki Narimatsu, Tochigi (JP); Naoki Funabashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 297 days.

(21) Appl. No.: 18/633,062

(22) Filed: Apr. 11, 2024

(65) Prior Publication Data

US 2024/0347986 A1 Oct. 17, 2024

(30) Foreign Application Priority Data

Apr. 17, 2023 (JP) ................................ 2023-067179

(51) Int. Cl.
*H01R 13/74* (2006.01)
*H01R 43/18* (2006.01)

(52) U.S. Cl.
CPC ........... *H01R 13/748* (2013.01); *H01R 43/18* (2013.01)

(58) Field of Classification Search
CPC .............................. H01R 13/748; H01R 43/18
See application file for complete search history.

(56) References Cited

U.S. PATENT DOCUMENTS

| | | | | |
|---|---|---|---|---|
| 11,146,029 | B1 * | 10/2021 | Shaffer | H01R 13/748 |
| 2014/0370745 | A1 * | 12/2014 | Wu | H01R 13/743 439/527 |
| 2020/0328554 | A1 * | 10/2020 | Asano | B60R 16/0239 |
| 2021/0036458 | A1 * | 2/2021 | Aoki | H01R 13/748 |
| 2021/0273372 | A1 * | 9/2021 | Nishitani | H01R 13/5202 |
| 2021/0362612 | A1 * | 11/2021 | Feldner | B60L 53/16 |
| 2022/0102879 | A1 * | 3/2022 | Kim | H01R 13/055 |
| 2022/0166174 | A1 * | 5/2022 | Uki | H01R 24/66 |
| 2022/0216651 | A1 * | 7/2022 | Nishijima | H01R 13/502 |

(Continued)

FOREIGN PATENT DOCUMENTS

| | | |
|---|---|---|
| JP | H1069943 A | 3/1998 |
| JP | H11167956 A | 6/1999 |

(Continued)

*Primary Examiner* — Abdullah A Riyami
*Assistant Examiner* — Nelson R. Burgos-Guntin
(74) *Attorney, Agent, or Firm* — Canon U.S.A., Inc. IP Division

(57) ABSTRACT

A plate-shaped member includes, in a state where a first fixing portion that includes a first component and a second component for fixing a connector to the plate-shaped member is attached to the connector, a first opening area into which the first fixing portion is inserted, a second opening area into which at least a part of the first fixing portion is inserted by changing a relative position between the first fixing portion and the plate-shaped member in a state where the first fixing portion is inserted into the first opening area, and a third opening area that is an opening into which a terminal portion is inserted and which has a size large enough to prevent interference between the terminal portion and the plate-shaped member in a case where the relative position is changed.

12 Claims, 8 Drawing Sheets

(56) References Cited

U.S. PATENT DOCUMENTS

| | | | | |
|---|---|---|---|---|
| 2022/0399673 | A1* | 12/2022 | Luellich | H01R 12/57 |
| 2022/0399674 | A1* | 12/2022 | Yao | H01R 13/5202 |
| 2023/0023796 | A1* | 1/2023 | Hirooka | H01R 9/24 |
| 2023/0039294 | A1* | 2/2023 | Yoshida | H01R 13/5202 |

FOREIGN PATENT DOCUMENTS

| | | | |
|---|---|---|---|
| JP | 2014013651 | A | 1/2014 |
| JP | 2014026143 | A | 2/2014 |
| JP | 2017126499 | A | 7/2017 |
| JP | 2021111564 | A | 8/2021 |

* cited by examiner

PLATE-SHAPED MEMBER, CONNECTOR FIXING METHOD, LITHOGRAPHY APPARATUS, AND MANUFACTURING METHOD OF ARTICLE

BACKGROUND

Field

The present disclosure relates to a plate-shaped member, a connector fixing method, a lithography apparatus, and a manufacturing method of an article.

Description of the Related Art

A connector is used to connect a peripheral device to a control unit or an information processing unit, such as a computer.

Some connectors, typified by a D-Sub type, are configured with a terminal portion, a flange portion, and a fixing portion. The fixing portion is often configured with a plurality of components. In a case of a screw-fixing type, a target object (for example, a plate-shaped member) to which the connector is fixed is sandwiched between components, such as a washer, a nut, and a screw, of the fixing portion and the flange portion, and the connector is fixed to the fixing portion by using a tool, such as a socket wrench. In a case where this kind of fixing work is performed inside an apparatus, the fixing work takes time since a work space is small and workability is poor. Japanese Patent Application Laid-Open No. 2014-13651 discusses a method for fixing a connector to a plate-shaped member using the plate-shaped member that grips the connector and a fixing screw without disassembling a washer, a nut, and a screw that are attached to the connector from a time of delivery.

According to the method discussed in Japanese Patent Application Laid-Open No. 2014-13651, however, a plurality of members, such as the plate-shaped member and the fixing screw, are used to fix the connector, so that there is a risk of losing the fixing screw before using the fixing screw.

SUMMARY

The present disclosure is directed to providing a plate-shaped member that can fix a connector in a state of reducing a possibility of losing a component.

A plate-shaped member includes, in a state where a first fixing portion that includes a first component and a second component for fixing a connector to the plate-shaped member is attached to the connector, a first opening area into which the first fixing portion is inserted, a second opening area into which at least a part of the first fixing portion is inserted by changing a relative position between the first fixing portion and the plate-shaped member in a state where the first fixing portion is inserted into the first opening area, and a third opening area that is an opening into which a terminal portion is inserted and which has a size large enough to prevent interference between the terminal portion and the plate-shaped member in a case where the relative position is changed. In a case where at least a part of the first fixing portion is inserted into the second opening area, a movement of the connector is restricted by restricting arrangements of the first component and the second component to opposite sides of each other with respect to the second opening area.

Further features of the present disclosure will become apparent from the following description of exemplary embodiments with reference to the attached drawings.

DESCRIPTION OF THE EMBODIMENTS

Figure 1:
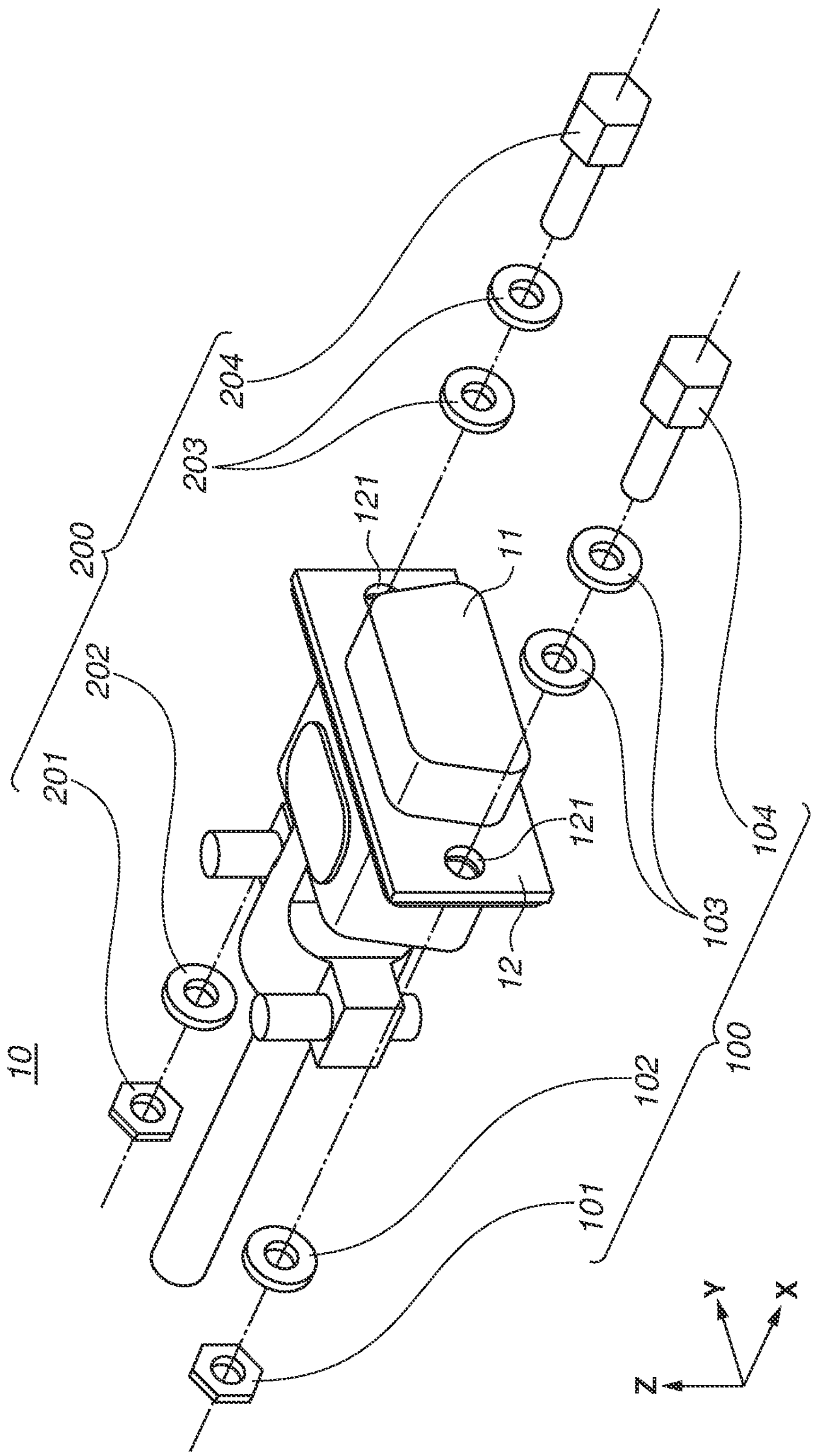
FIG. 1 is an exploded perspective view of a connector according to a first exemplary embodiment.

Exemplary embodiments of the present disclosure will be described below with reference to the attached drawings. It is noted that the following exemplary embodiments are not meant to limit the scope of the present disclosure as encompassed by the appended claims. A plurality of features is described in the exemplary embodiments, but not all of these features are essential to the present disclosure, and the plurality of features may be arbitrarily combined. The same or similar configurations in the attached drawings are denoted by the same reference numerals, and redundant descriptions will be omitted.

According to the present specification and drawings, directions are basically indicated by an XYZ coordinate system in which a vertical direction is a Z axis and a horizontal plane perpendicular to the vertical direction is an XY plane, where each axis is perpendicular to each other. However, if an XYZ coordinate system is illustrated in each drawing, the coordinate system is prioritized.

A specific configuration will now be described according to each exemplary embodiment.

FIG. 1 is an exploded perspective view of a connector 10 according to a first exemplary embodiment. According to the present exemplary embodiment, an example in which the connector 10 is a D-sub type connector will be described. The connector 10 includes a terminal portion (connection portion) 11 for connecting to an apparatus or another connector, a flange portion 12, a first fixing portion 100, and a second fixing portion 200. The terminal portion 11 protrudes from the flange portion 12.

The first fixing portion 100 includes a nut 101 (first component), a spring washer 102, a washer 103, and a screw 104 (second component). The second fixing portion 200 includes a nut 201 (third component), a spring washer 202, a washer 203, and a screw 204 (fourth component). The flange portion 12 has holes 121 through which the screws 104 and 204 can penetrate.

In a case where such a connector 10 is attached to an existing plate-shaped member (panel), fixation between the first fixing portion 100 and the second fixing portion 200 is firstly loosen, and the first fixing portion 100 and the second fixing portion 200 are respectively disassembled. Next, the terminal portion 11 is inserted into a hole for the terminal portion 11 provided in the plate-shaped member to bring the flange portion 12 into contact with the plate-shaped member, and a position of the hole 121 of the flange portion 12 is matched to a position of the hole provided in the plate-shaped member. In such a state, on a side of the first fixing portion 100, the nut 101, the spring washer 102, the flange portion 12, the plate-shaped member, the washer 103, and the screw 104 are fixed by the first fixing portion 100 in this order from a −X direction side. On a side of the second fixing portion 200, the nut 201, the spring washer 202, the flange portion 12, the plate-shaped member, the washer 203, and the screw 204 are fixed by the second fixing portion 200 in this order from the −X direction side. Using such a method, the connector 10 can be attached to the existing plate-shaped member.

In the above-described method, an operator should disassemble and fix again the first fixing portion 100 and the second fixing portion 200 of the connector 10, and there is a risk of losing a component of the first fixing portion 100 and the second fixing portion 200 during the work. In the above-described method, it is also helpful to hold a plurality of components included in the first fixing portion 100 and the second fixing portion 200 by using a socket wrench in the +X direction side and the −X direction side of the connector 10, and it takes time to fix.

A plate-shaped member 20 according to the present exemplary embodiment can fix the connector 10 to the plate-shaped member 20 without disassembling the first fixing portion 100 and the second fixing portion 200 of the connector 10, and it is thus possible to fix the connector 10 while reducing a possibility of losing a component. Since the first fixing portion 100 and the second fixing portion 200 of the connector 10 are not disassembled, the plate-shaped member 20 according to the present exemplary embodiment can reduce time for fixing.

Figure 2:
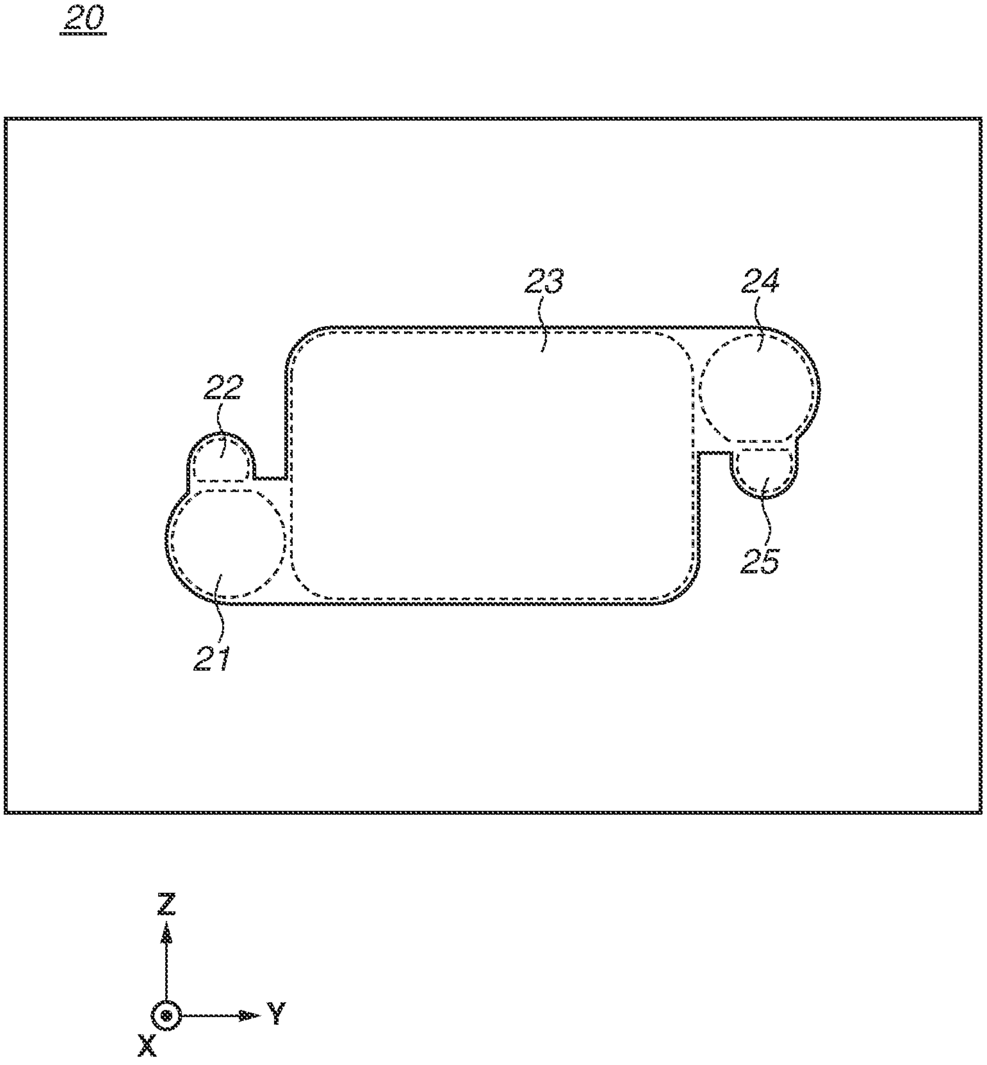
FIG. 2 illustrates a plate-shaped member according to the first exemplary embodiment.
Figure 3A:
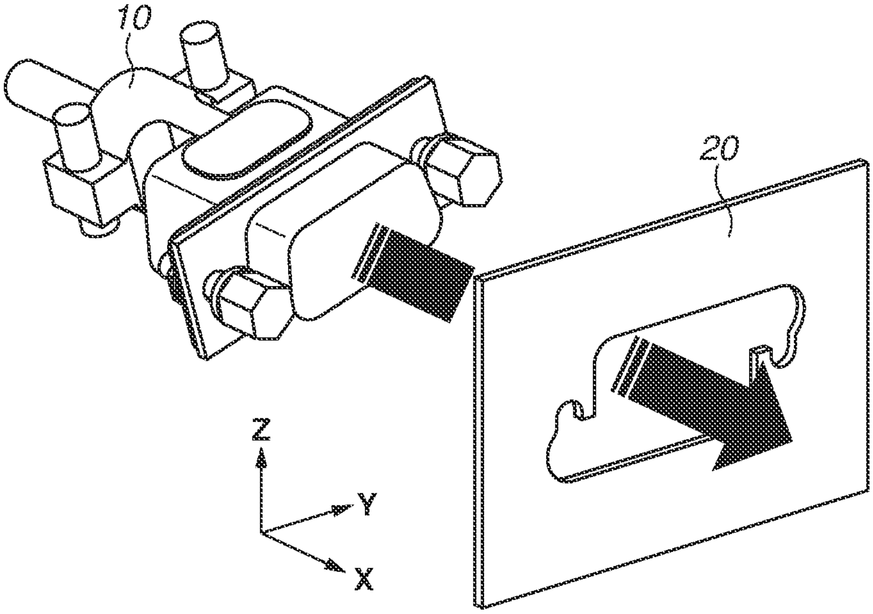
FIGS. 3A to 3C are schematic diagrams illustrating a method for fixing the connector to the plate-shaped member according to the first exemplary embodiment.
Figure 3B:
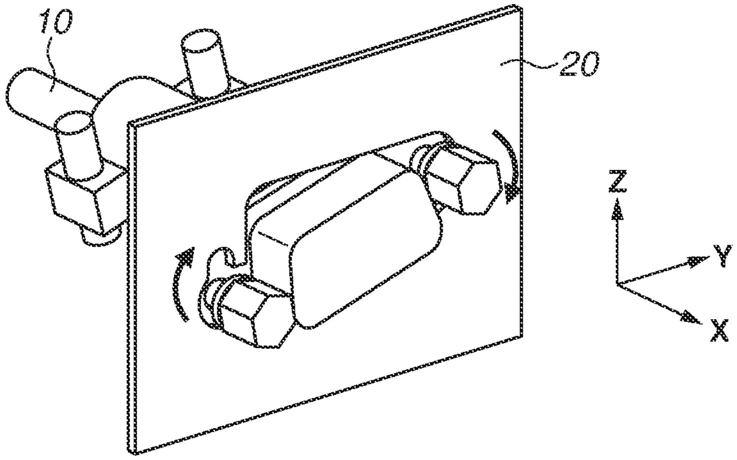
Figure 3C:
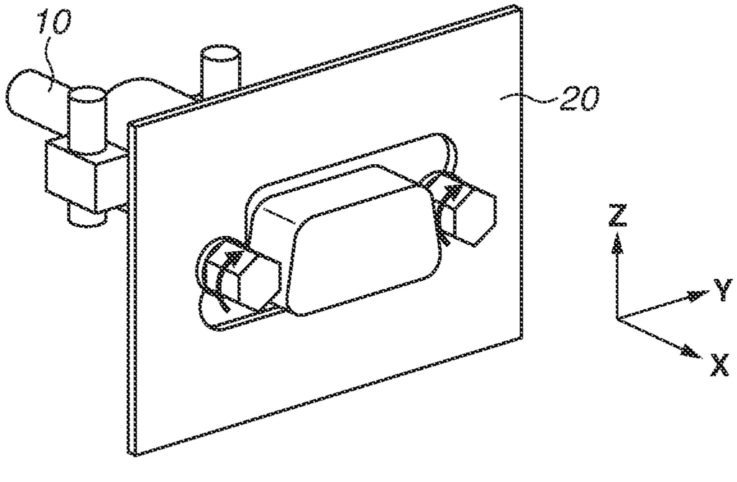
Figure 4:
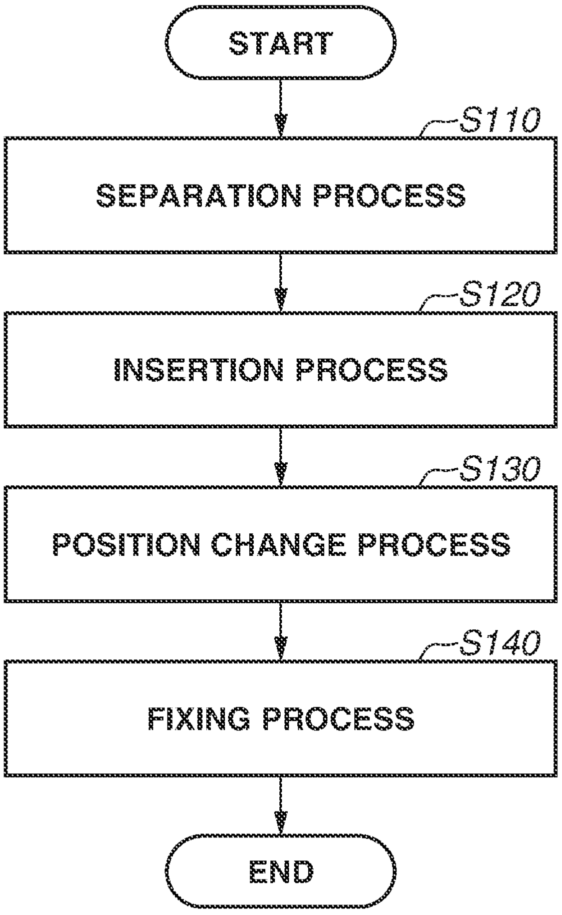
FIG. 4 is a flowchart for fixing the connector to the plate-shaped member according to the first exemplary embodiment.

FIG. 2 illustrates the plate-shaped member 20 according to the present exemplary embodiment. FIGS. 3A to 3C are schematic diagrams illustrating a method for fixing the connector 10 to the plate-shaped member 20 according to the present exemplary embodiment. FIG. 4 is a flowchart for fixing the connector 10 to the plate-shaped member 20 according to the present exemplary embodiment.

The plate-shaped member 20 illustrated in FIG. 2 includes a first opening area 21 into which the first fixing portion 100 can be inserted, a second opening area 22, a third opening area 23, a fourth opening area 24 into which the second fixing portion 200 can be inserted, and a fifth opening area 25. A relative position between the first fixing portion 100 and the plate-shaped member 20 is changed in a state where the first fixing portion 100 is inserted into the first opening area 21, and thereby at least a part of the first fixing portion 100 is inserted into the second opening area 22. A state where at least a part of the first fixing portion 100 is inserted into the second opening area 22 is, for example, a state where a screw portion of the screw 104 (second component) is inserted into the second opening area 22 and the nut 101 (first component) and a head of the screw 104 (second component) are not inserted into the second opening area 22. The screw portion is a portion provided with a thread. The third opening area 23 is an opening into which the terminal portion 11 can be inserted and which has a size large enough to prevent interference between the terminal portion 11 and the plate-shaped member 20 even if the relative position is changed between the first fixing portion 100 and the plate-shaped member 20. The plate-shaped member 20 restricts a movement of the connector 10 by restricting arrangements of the nut 101 (first component) and the screw 104 (second component) to opposite sides of each other with respect to the second opening area 22 in a case where at least a part of the first fixing portion 100 is inserted into the second opening area 22.

An area of the first opening area 21 is larger than a maximum area of the head of the screw 104 (second component) in a plane parallel to a plane of the plate-shaped member 20 that is in contact with the flange portion 12. An area of the second opening area 22 is smaller than the maximum area of the head of the screw 104 (second component) and a maximum area of the nut 101 (first component) in the plane parallel to the plane of the plate-shaped member 20 that is in contact with the flange portion 12. An area of the fourth opening area 24 is larger than a maximum area of a head of the screw 204 (fourth component) in the plane parallel to the plane of the plate-shaped member 20 that is in contact with the flange portion 12. An area of the fifth opening area 25 is smaller than the maximum area of the head of the screw 204 (fourth component) and a maximum area of the nut 201 (third component) in the plane parallel to the plane of the plate-shaped member 20 that is in contact with the flange portion 12. In other words, the area of the first opening area 21 is larger than the area of the second opening area 22, and the area of the fourth opening area 24 is larger than the area of the fifth opening area 25. The plane parallel to the plane of the plate-shaped member 20 that is in contact with the flange portion 12 is the plane parallel to the plane of the plate-shaped member 20 that is in contact with the flange portion 12 in a state where the plate-shaped member 20 and the flange portion 12 are in contact with each other without any gap. In the plate-shaped member 20 according to the present exemplary embodiment, the second opening area 22 and the fifth opening area 25 are provided at the same position in the vertical direction (the Z direction or the height direction).

Here, positions of the first opening area 21, the second opening area 22, the third opening area 23, the fourth opening area 24, and the fifth opening area 25 may be located at positions corresponding to portions of the connector 10 to be inserted. The positions of the first opening area 21, the second opening area 22, the third opening area 23, the fourth opening area 24, and the fifth opening area 25 may be shifted in a range in which the connector 10 and the plate-shaped member 20 do not interfere with each other at the time of fixing the connector 10 to the plate-shaped member 20.

In a case where the connector 10 is fixed (attached) to the plate-shaped member 20 according to the present exemplary embodiment, the first fixing portion 100 and the second fixing portion 200 of the connector 10 are loosened in advance in a state where the first fixing portion 100 and the second fixing portion 200 are attached to the connector 10. Specifically, in step S110, the nut 101 (first component) and the screw 104 (second component) are separated such that a gap greater than or equal to a thickness of the plate-shaped member 20 in the X direction is generated in a state where the first fixing portion 100 is attached to the connector 10 (separation process). In the separation process, the nut 201 (third component) and the screw 204 (fourth component) are separated such that a gap greater than or equal to the thickness of the plate-shaped member 20 in the X direction is generated in a state where the second fixing portion 200 is attached to the connector 10. At this time, the first fixing portion 100 and the second fixing portion 200 of the connector 10 are not disassembled, the nut 101 and the screw 104 are in contact with each other, and the nut 201 and the screw 204 are also in contact with each other.

First, as illustrated in FIG. 3A, the connector 10 is inserted into the plate-shaped member 20 such that the first fixing portion 100, the terminal portion 11, and the second fixing portion 200 of the connector 10 are respectively inserted into the first opening area 21, the third opening area 23, and the fourth opening area 24. At this time, according to the present exemplary embodiment, in step S120, the connector 10 is inserted in a rotated state (oblique state) in a YZ plane (insertion process). The first opening area 21 allows the first fixing portion 100 to be inserted therein, and the fourth opening area 24 allows the second fixing portion 200 to be inserted therein. Specifically, the area of the first opening area 21 is larger than the maximum area of the head of the screw 104 in the plane parallel to the plane of the plate-shaped member 20 that is in contact with the flange portion 12. The area of the fourth opening area 24 is larger than the maximum area of the head of the screw 204 in the plane parallel to the plane of the plate-shaped member 20 that is in contact with the flange portion 12. The first fixing portion 100 and the second fixing portion 200 can thereby penetrate the plate-shaped member 20.

As illustrated in FIG. 3B, in step S130, the relative position between the first fixing portion 100 and the plate-shaped member 20 is changed in a state where the first fixing portion 100 is inserted into the first opening area 21 (a state where the second fixing portion 200 is inserted into the fourth opening area 24) (position change process). This is the same as changing the relative position between the second fixing portion 200 and the plate-shaped member 20.

Specifically, the change in the relative position is to rotate the connector 10 around an X-axis.

At least a part of the first fixing portion 100 (the screw portion of the screw 104) is thereby inserted into the second opening area 22. At least a part of the second fixing portion 200 (the screw portion of the screw 204) is then inserted into the fifth opening area 25. At this time, on the side of the first fixing portion 100, the relative position between the first fixing portion 100 and the plate-shaped member 20 is changed such that the nut 101, the spring washer 102, the flange portion 12, the plate-shaped member 20, the washer 103, and the screw 104 are arranged in this order from the −X direction side. On the side of the second fixing portion 200, the nut 201, the spring washer 202, the flange portion 12, the plate-shaped member 20, the washer 203, and the screw 204 are arranged in this order from the −X direction side.

After the position change process, the plate-shaped member 20 restricts the movement of the connector 10 by restricting the arrangements of the nut 101 (first component) and the screw 104 (second component) to the opposite sides of each other with respect to the second opening area 22. The plate-shaped member 20 restricts the movement of the connector 10 by restricting the arrangements of the nut 201 (third component) and the screw 204 (fourth component) to the opposite sides of each other with respect to the fifth opening area 25. Specifically, the area of the second opening area 22 is smaller than the maximum area of the head of the screw 104 and the maximum area of the nut 101 in the plane parallel to the plane of the plate-shaped member 20 that is in contact with the flange portion 12. The area of the fifth opening area 25 is smaller than the maximum area of the head of the screw 204 and the maximum area of the nut 201 in the plane parallel to the plane of the plate-shaped member 20 that is in contact with the flange portion 12. Each of the first fixing portion 100 and the second fixing portion 200 can sandwich the plate-shaped member 20 without disassembling each of the first fixing portion 100 and the second fixing portion 200.

Since the third opening area 23 is the opening having the size large enough to prevent interference between the terminal portion 11 and the plate-shaped member 20, the terminal portion 11 and the plate-shaped member 20 do not interfere with each other even if the relative position is changed. It is desirable that each opening area is provided such that a rotational movement can be performed smoothly in a case where the change in the relative position between the first fixing portion 100 and the plate-shaped member 20 is a change in a position at which the first fixing portion 100 rotates on the YZ plane with respect to the plate-shaped member 20. Specifically, each opening area may be provided such that centers of the first opening area 21, the second opening area 22, the fourth opening area 24, and the fifth opening area 25 are on a circumference of which a diameter is a distance between the first fixing portion 100 and the second fixing portion 200.

In this state, as illustrated in FIG. 3C, in step S140, the connector 10 is fixed to the plate-shaped member 20 by the first fixing portion 100 (fixing process). Specifically, the fixing process is to fix the connector 10 to the plate-shaped member 20 by tightening (fastening) the first fixing portion 100 and the second fixing portion 200, which are loosened, to fix.

In the plate-shaped member 20 according to the present exemplary embodiment, the second opening area 22 and the fifth opening area 25 are provided at the same position in the vertical direction (the Z direction or the height direction). Accordingly, the connector 10 can be fixed in a horizontal state by fixing the connector 10 to the plate-shaped member 20 in a state where the first fixing portion 100 is located in the second opening area 22 and the second fixing portion 200 is located in the fifth opening area 25. Here, according to the present exemplary embodiment, an example is described in which the change in the relative position between the fixing portion and the plate-shaped member 20 is rotation. However, the change in the relative position is not limited to rotation, and for example, the connector 10 may be moved in one predetermined direction.

Figure 5A:
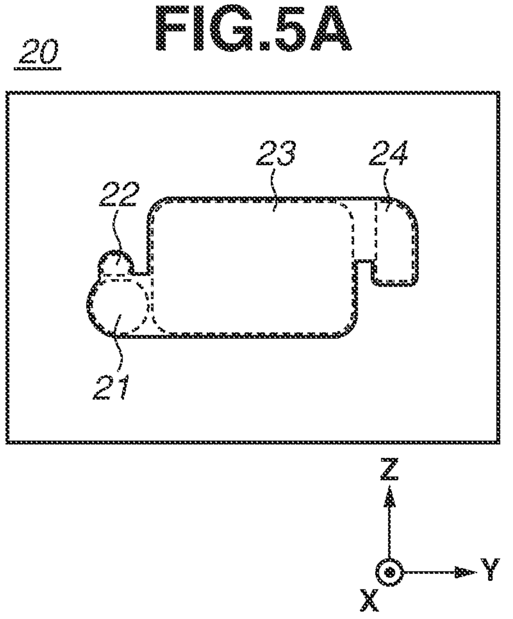
FIGS. 5A to 5E illustrate other examples of the plate-shaped member according to the first exemplary embodiment.
Figure 5B:
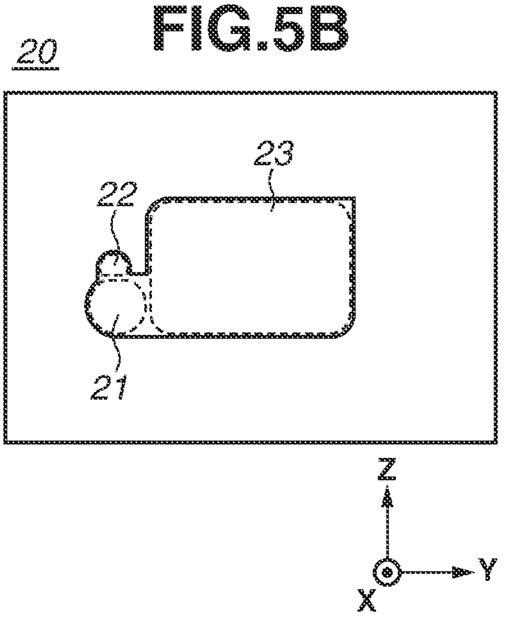
Figure 5C:
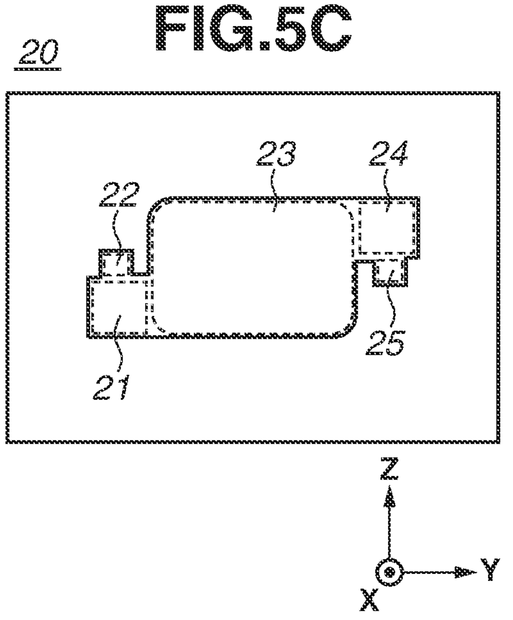
Figure 5D:
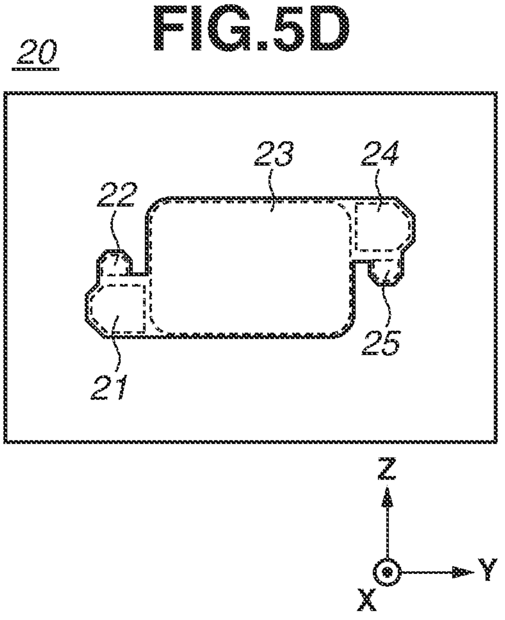
Figure 5E:
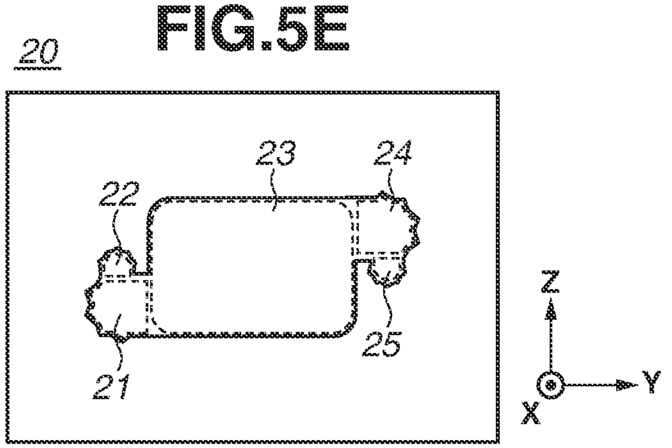
Figure 6A:
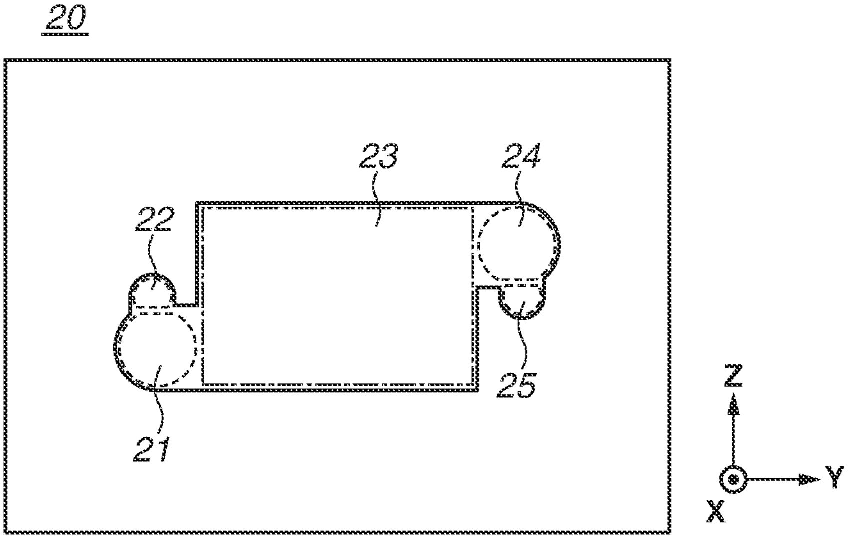
FIGS. 6A to 6C illustrate other examples of the plate-shaped member according to the first exemplary embodiment.
Figure 6B:
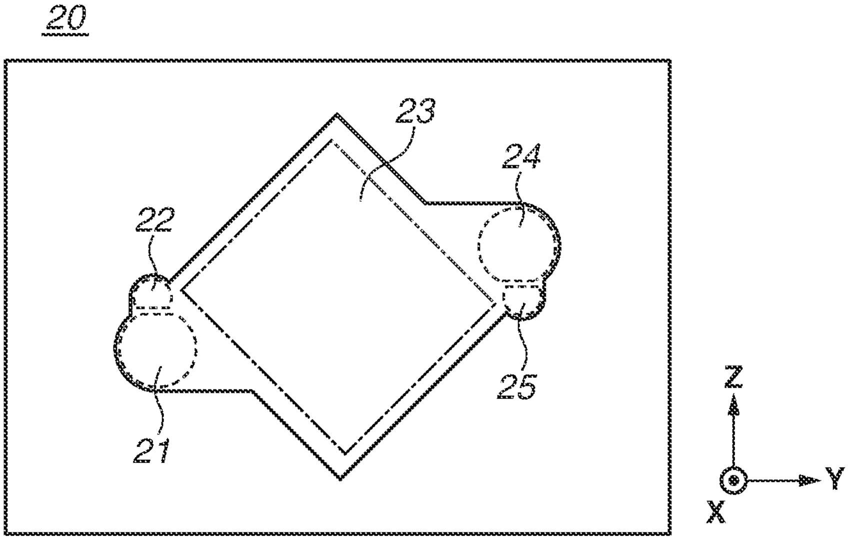
Figure 6C:
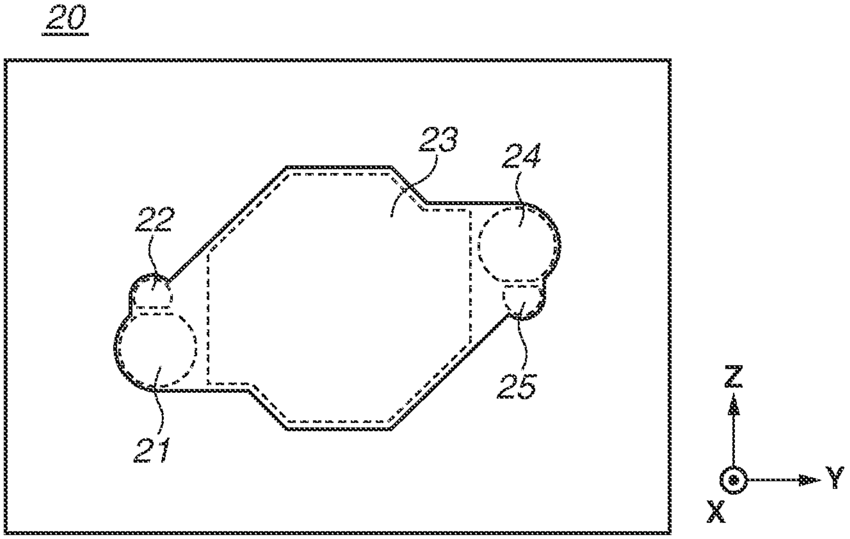

FIGS. 5A to 5E illustrate other examples of the plate-shaped member 20 according to the present exemplary embodiment. FIG. 5A is an example in which the fifth opening area 25 is not provided, and the area of the fourth opening area 24 is large. In this case, the connector 10 is fixed using the first fixing portion 100 corresponding to the first opening area 21 and the second opening area 22. FIG. 5B is an example in which the fourth opening area 24 and the fifth opening area 25 are not provided. This configuration can be used in a case of fixing the connector 10 without the second fixing portion 200. Alternatively, this configuration can be used in a case where the second fixing portion 200 is removed from the connector 10, and the connector 10 is fixed using only the first fixing portion 100. FIG. 5C is an example in which the first opening area 21, the second opening area 22, the fourth opening area 24, and the fifth opening area 25 are rectangles. FIGS. 5D and 5E are examples in which the first opening area 21, the second opening area 22, the fourth opening area 24, and the fifth opening area 25 are polygons. FIGS. 6A to 6C also illustrate other examples of the plate-shaped member 20 according to the present exemplary embodiment, and shapes of the third opening area 23 are different from each other. The shapes of the plate-shaped member 20 according to the present exemplary embodiment are not limited to these examples as long as the connector 10 can be fixed to the plate-shaped member 20 without disassembling the first fixing portion 100 and the second fixing portion 200. Further, the plate-shaped member 20 is formed by, for example, laser processing, punching, cutting, and a three-dimensional (3D) printer.

Here, according to the present exemplary embodiment, an example of a D-sub type connector 10 in which a fixing portion is a screw type is described, but the fixing portion is not limited to the screw type, and it is sufficient that the plate-shaped member 20 can be sandwiched between the fixing portions of the connector 10. For example, a magnetic type fixing portion may be used. In addition, the connector 10 is not limited to the D-sub type connector as long as it can sandwich the plate-shaped member 20 between the fixing portions. The connector 10 may be, for example, a Universal Serial Bus (USB) connector, a relay connector, or a power supply connector.

As described above, the plate-shaped member 20 according to the present exemplary embodiment can fix the connector 10 thereto without disassembling the fixing portion of the connector 10 and can fix the connector 10 in a state of reducing a possibility of losing a component. Here, not disassembling the fixing portion means that the first component (nut) and the second component (screw) included in the fixing portion are always in contact with each other. Since the first fixing portion 100 and the second fixing portion 200 of the connector 10 are not disassembled, the plate-shaped member 20 according to the present exemplary embodiment can shorten a time for fixation.

A second exemplary embodiment is an exemplary embodiment in which the plate-shaped member 20 according to the first exemplary embodiment is used in a lithography apparatus.

Figure 7:
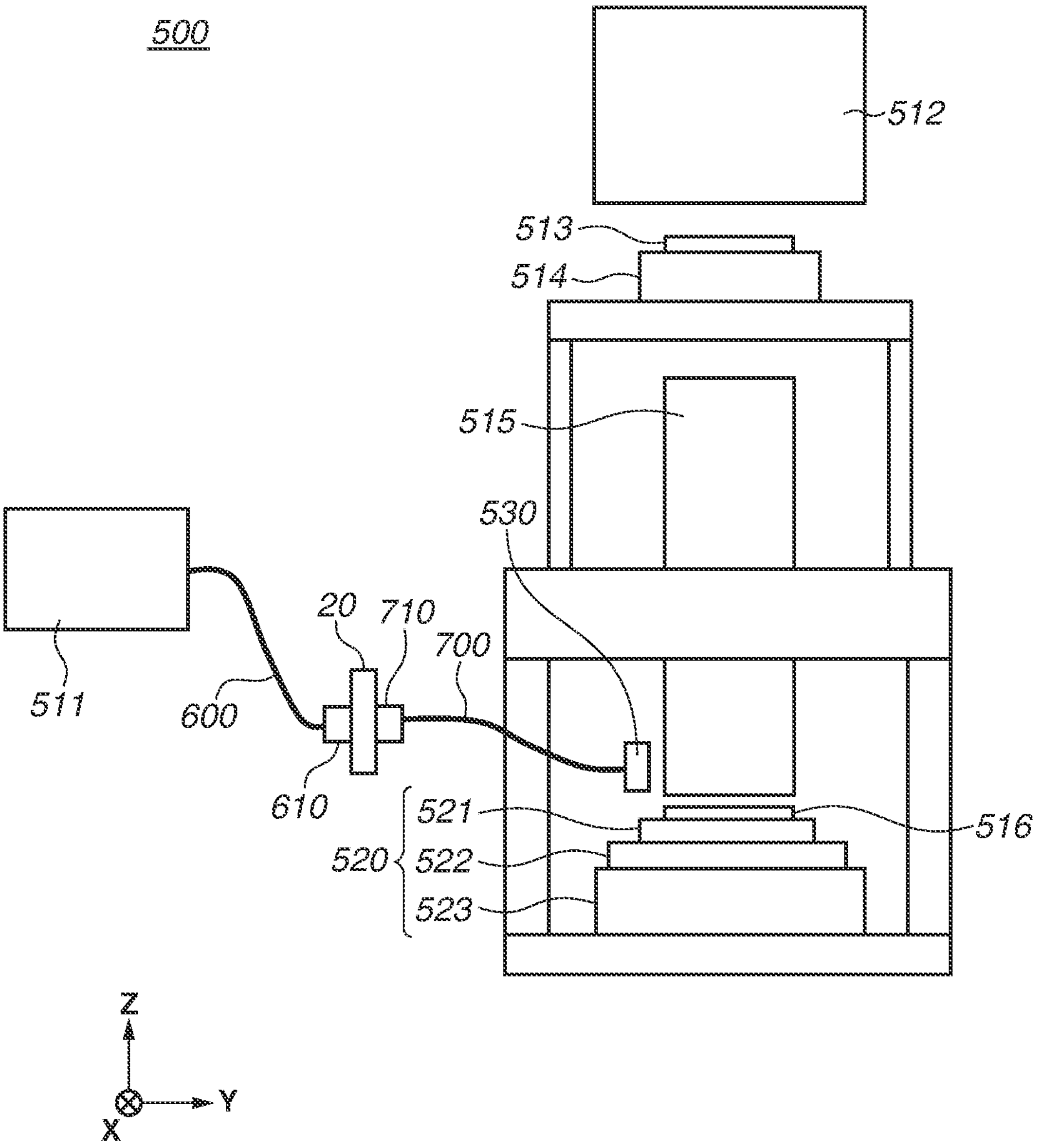
FIG. 7 is a schematic diagram illustrating a configuration of a lithography apparatus according to a second exemplary embodiment.

FIG. 7 is a schematic diagram illustrating a configuration of a lithography apparatus 500 according to the present exemplary embodiment. The lithography apparatus 500 according to the present exemplary embodiment is a projection exposure apparatus that exposes a pattern of an original plate (e.g., mask, and reticle) onto a substrate via a projection optical system using a step-and-repeat method or a step-and-scan method. However, the lithography apparatus 500 is not limited to a projection exposure apparatus. For example, the lithography apparatus 500 may be an imprint apparatus that molds an imprint material on a substrate using a mold to form a pattern on the substrate. Alternatively, the lithography apparatus 500 may be a flattening apparatus that uses a flat plate to flatten a composition on a substrate.

The lithography apparatus 500 includes an illumination optical system 512, a projection optical system 515, a reticle stage 514 that holds a reticle 513, a stage 520 that can move while holding a substrate 516, an off-axis scope (OAS) 530, and a control unit 511. The off-axis scope 530 is a measurement unit that performs measurement on the substrate 516 or the stage 520. The control unit 511 performs control based on a measurement result of the off-axis scope 530.

The stage 520 includes an XY stage 523 that can move in the XY plane, a fine motion stage 522 that is placed on the XY stage 523 and can be finely moved, and a substrate chuck 521 that holds the substrate 516 in a state of being held by the fine motion stage 522. The fine motion stage 522 can be moved (driven) in an X axis direction, a Y axis direction, a Z axis direction (an optical axis direction of the projection optical system 515), a θx axis direction, a θy axis direction, and a θz axis direction. In other words, the fine motion stage 522 can be moved (driven) in six axis directions. Here, the θx axis direction is a rotation direction around an X axis, the θy axis direction is a rotation direction around a Y axis, and the θz axis direction is a rotation direction around the Z axis. Further, a position in the θx axis direction means a rotation angle around the X axis, a position in the θy axis direction means a rotation angle around the Y axis, and a position in the θz axis direction means a rotation angle around the Z axis.

The reticle 513 is an original plate on which a pattern (e.g., a circuit pattern) to be transferred to a surface of, for example, quartz glass is formed with chromium. Further, the substrate 516 is, for example, single crystal silicon, and a photosensitive material (resist) is applied to a surface of the substrate 516 to be transported to the lithography apparatus 500. Here, the illumination optical system 512 is a pattern forming unit that forms a pattern on the substrate 516. According to the present exemplary embodiment, an example of the lithography apparatus 500 that forms a pattern using light is described, and the pattern forming unit is the illumination optical system 512. However, the present disclosure can be applied to a lithography apparatus that hardens a thermosetting material by heat. In such a case, the pattern forming unit is, for example, a heating unit that heats the thermosetting material. The control unit 511 controls each unit in the lithography apparatus 500.

The off-axis scope 530 is used to position the substrate 516 and detect positions of a plurality of pattern areas on the substrate 516. The off-axis scope 530 detects a relative position and an orientation relationship between an alignment mark (not illustrated) formed on the substrate 516 and a reference mark (not illustrated) on the fine motion stage 522. The lithography apparatus 500 positions the stage 520 (the substrate 516) based on a measurement result of the off-axis scope 530 and measurement results using a laser interferometer and a bar mirror, which will be described below.

In the lithography apparatus 500, exposure light from a light source (not illustrated) illuminates the reticle 513 held on the reticle stage 514 via the illumination optical system 512. The light transmitted through the reticle 513 is irradiated onto the substrate 516 via the projection optical system 515. At this time, the light from the pattern formed on the reticle 513 forms an image on the surface of the substrate 516. The lithography apparatus 500 thus exposes a shot area on the substrate 516 with light, and similarly performs exposure for each of a plurality of shot areas.

According to the present exemplary embodiment, an example is described in which a connector 610 of a cable (wiring) 600 connected to the control unit 511 and a connector 710 of a cable (wiring) 700 connected to the off-axis scope 530 are connected using the plate-shaped member 20. The connector 610 is fixed to the plate-shaped member 20 using the method described according to the first exemplary embodiment. The connector 610 fixed to the plate-shaped member 20 is then connected to the connector 710.

An inside of the lithography apparatus 500 often has a small work space for an operator, resulting in poor workability. By using the plate-shaped member 20 according to the present exemplary embodiment, the connector can be fixed to the plate-shaped member 20 without disassembling the fixing portion of the connector even in a case where work is performed in a location with poor workability, such as the inside of the lithography apparatus 500, and thus a possibility of losing a component can be reduced. Since the first fixing portion 100 and the second fixing portion 200 of the connector 10 are not disassembled, the plate-shaped member 20 according to the present exemplary embodiment can shorten a time for fixing.

According to the present exemplary embodiment, the example is described in which the connector 610 of the cable 600 connected to the control unit 511 and the connector 710 of the cable 700 connected to the off-axis scope 530 are connected using the plate-shaped member 20. However, a connection destination is not limited to the control unit 511 or the off-axis scope 530 and may be any device in the lithography apparatus 500.

Alternatively, the plate-shaped member 20 may be used to connect the inside of the lithography apparatus 500 and the outside of the lithography apparatus 500.

A third exemplary embodiment is characterized in that an article is manufactured using the above-described plate-shaped member 20.

Figure 8:
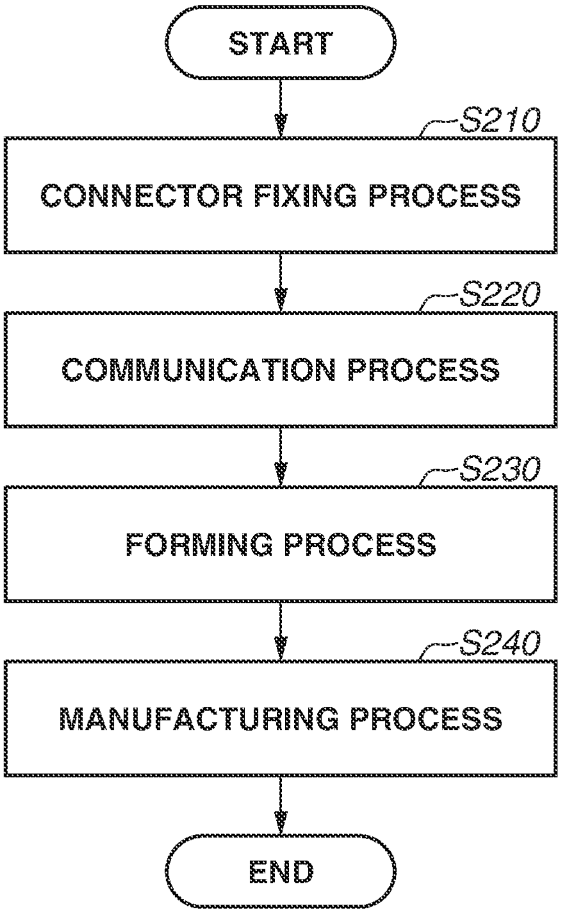
FIG. 8 is a flowchart for a manufacturing method of an article according to a third exemplary embodiment.

FIG. 8 is a flowchart illustrating a manufacturing method of an article according to the present exemplary embodiment. First, in step S210, a connector fixing process is performed in which the connector 10 that includes the flange portion 12 and the terminal portion 11 protruding from the flange portion 12 is fixed to the plate-shaped member 20.

Next, in step S220, a communication process is performed in which information about the substrate 516 is communicated via the connector 10 fixed to the plate-shaped member 20. In step S230, a forming process is then performed in which a pattern is formed on the substrate 516 based on the information communicated in the communication process. In step S240, a manufacturing process is performed in which an article is manufactured from the substrate 516 on which the pattern is formed in the forming process.

An article manufactured through the manufacturing method is, for example, a semiconductor integrated circuit (IC) element, a liquid crystal display element, a color filter, and a micro-electromechanical system (MEMS).

In the forming process, a pattern is formed on the substrate by exposing, for example, the substrate (e.g., silicon wafer, glass plate) applied with the photosensitive material with light using an exposure apparatus (lithography apparatus).

The manufacturing process includes, for example, developing the substrate (photosensitive material) on which the pattern is formed, etching, resist stripping, dicing, bonding, and packaging on the developed substrate.

The present disclosure is not limited to the above-described exemplary embodiments, and various modifications and changes can be made without departing from the spirit and the scope of the present disclosure. Therefore, the following claims are attached in order to publicize the scope of the present disclosure.

According to the present disclosure, it is possible to provide a plate-shaped member that can fix a connector in a state of reducing a possibility of losing a component.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-067179, filed Apr. 17, 2023, which is hereby incorporated by reference herein in its entirety.

What is claimed is:

1. A plate-shaped member that fixes a connector including a flange portion and a terminal portion protruding from the flange portion, the plate-shaped member comprising;

in a state where a first fixing portion that includes a first component and a second component for fixing the connector to the plate-shaped member is attached to the connector, a first opening area into which the first fixing portion is inserted;

a second opening area into which at least a part of the first fixing portion is inserted by changing a relative position between the first fixing portion and the plate-shaped member in a state where the first fixing portion is inserted into the first opening area; and a third opening area that is an opening into which the terminal portion is inserted and which has a size large enough to prevent interference between the terminal portion and the plate-shaped member in a case where the relative position is changed, wherein, in a case where at least a part of the first fixing portion is inserted into the second opening area, a movement of the connector is restricted by restricting arrangements of the first component and the second component to opposite sides of each other with respect to the second opening area.

2. The plate-shaped member according to claim 1, wherein at least a part of the first fixing portion is inserted into the second opening area by rotation of the connector.

3. The plate-shaped member according to claim 1, further comprising:

a fourth opening area into which a second fixing portion including a third component and a fourth component is inserted; and a fifth opening area into which at least a part of the second fixing portion is inserted by changing the relative position between the first fixing portion and the plate-shaped member in a state where the second fixing portion is inserted into the fourth opening, wherein, in a case where at least a part of the second fixing portion is inserted into the fifth opening area, a movement of the connector is restricted by restricting arrangements of the third component and the fourth component to opposite sides of each other with respect to the fifth opening area.

4. The plate-shaped member according to claim 3, wherein the second opening area and the fifth opening area are provided such that the second opening area and the fifth opening area are located at a same position in a vertical direction.

5. The plate-shaped member according to claim 3, wherein the first opening area, the second opening area, the fourth opening area, and the fifth opening area are provided such that respective centers of the first opening area, the second opening area, the fourth opening area, and the fifth opening area are on a circumference of which a diameter is a distance between the first fixing portion and the second fixing portion.

6. The plate-shaped member according to claim 1, wherein an area of the first opening area is larger than an area of the second opening area.

7. A method for fixing a connector including a flange portion and a terminal portion protruding from the flange portion to a plate-shaped member, the method comprising:

separating, in a state where a first fixing portion that includes a first component and a second component for fixing the connector to the plate-shaped member is attached to the connector, the first component and the second component;

inserting the connector into the plate-shaped member;

changing a relative position between the first fixing portion and the plate-shaped member while sandwiching the plate-shaped member between the first component and the second component after the inserting; and fixing the connector to the plate-shaped member by using the first fixing portion after the changing, wherein, after the changing, a movement of the connector is restricted by restricting arrangements of the first component and the second component to opposite sides of each other with the plate-shaped member in between.

8. The method according to claim 7, wherein the first component is a nut, and the second component is a screw.

9. The method according to claim 7, wherein, in the separating, the first component and the second component are separated such that a gap greater than or equal to a thickness of the plate-shaped member is generated.

10. The method according to claim 7, wherein the connector is a D-sub type connector.

11. A method for manufacturing an article, the method comprising:

communicating information about a substrate via a connector fixed to a plate-shaped member;

forming a pattern on the substrate based on the information in the communicating; and manufacturing an article from the substrate on which the pattern is formed in the forming, wherein the connector includes a flange portion and a terminal portion protruding from the flange portion, wherein the plate-shaped member includes:

in a state where a first fixing portion that includes a first component and a second component for fixing the connector to the plate-shaped member is attached to the connector, a first opening area into which the first fixing portion is inserted;

a second opening area into which at least a part of the first fixing portion is inserted by changing a relative position between the first fixing portion and the plate-shaped member in a state where the first fixing portion is inserted into the first opening area; and a third opening area that is an opening into which the terminal portion is inserted and which has a size large enough to prevent interference between the terminal portion and the plate-shaped member in a case where the relative position is changed, and wherein, in a case where at least a part of the first fixing portion is inserted into the second opening area, a movement of the connector is restricted by restricting arrangements of the first component and the second component to opposite sides of each other with respect to the second opening area.

12. A method for manufacturing an article, the method comprising:

fixing a connector including a flange portion and a terminal portion protruding from the flange portion to a plate-shaped member;

communicating information about a substrate via the connector fixed to the plate-shaped member;

forming a pattern on the substrate based on the information communicated in the communicating; and manufacturing an article from the substrate on which the pattern is formed in the forming, wherein the fixing includes:

separating, in a state where a first fixing portion that includes a first component and a second component for fixing the connector to the plate-shaped member is attached to the connector, the first component and the second component;

inserting the connector into the plate-shaped member;

changing a relative position between the first fixing portion and the plate-shaped member while sandwiching the plate-shaped member between the first component and the second component after the inserting; and fixing the connector to the plate-shaped member by using the first fixing portion after the changing, and wherein, after the changing, a movement of the connector is restricted by restricting arrangements of the first component and the second component to opposite sides of each other with the plate-shaped member in between.

* * * * *